United States Patent Office 3,549,696
Patented Dec. 22, 1970

3,549,696
MANUFACTURE OF OXALIC ACID
Jacques Marius Duroux and Louis Marius Elie Pichon, Lyon, France, assignors to Rhone-Poulenc S.A., Paris, France, a French body corporate
Filed May 23, 1967, Ser. No. 640,599
Claims priority, application France, May 25, 1966, 62,973
Int. Cl. C07c 51/32
U.S. Cl. 260—533     3 Claims

ABSTRACT OF THE DISCLOSURE

Oxalic acid is produced by oxidising propylene, or an intermediate product containing two or three carbon atoms which can be formed by nitric acid and/or nitrogen peroxide oxidation of propylene, with nitric acid in the presence of, as catalyst, iron, aluminium, chromium, tin, bismuth iodine or a compound thereof which is soluble in the reaction medium.

---

Figure 1:
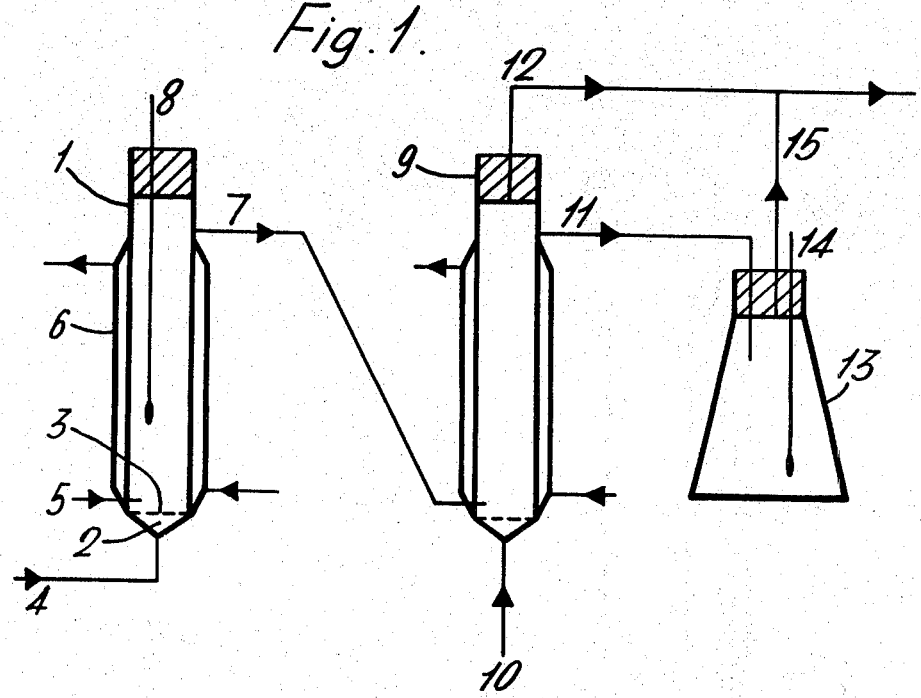

The present invention relates to the manufacture of oxalic acid by nitric acid oxidation, in the presence of a catalyst, of propylene or of the intermediate products which can be formed by the oxidation of propylene by nitric acid and/or nitrogen peroxide.

Industrially oxalic acid is manufactured from alkali metal formates such as sodium formate, by a process which comprises formation of alkali metal oxalates, conversion to calcium oxalate, and liberation of oxalic acid by treatment with sulphuric acid, calcium sulphate being formed as a by-product. All these stages and the formation of a by-product which is difficult to recover reduce the value of this process despite the good yields of oxalic acid which it produces.

It has also been proposed to prepare oxalic acid from a common and cheap raw material such as propylene. According to the process of German patent specification No. 742,053, oxalic acid is prepared in one step by oxidising propylene with nitric acid or with a mixture of sulphuric and nitric acids in the presence or absence of oxygen and/or nitrogen peroxide, at normal or superatmospheric pressure. It has also been proposed (see U.S. patent specification No. 3,081,345) to manufacture oxalic acid in two stages: (1) oxidation of liquid propylene at between —30° and +21° C., leading to intermediate products; followed by (2) oxidation of the intermediate products of the first stage, at between 60° and 120° C., with an oxidising agent which is preferably a mixture of sulphuric and nitric acids but which may also be nitric acid by itself or nitrogen peroxide (with the use of pressure).

In either method of oxidation of propylene certain intermediate products, especially α-nitratolacetic acid (see S. Fumazoni et al., La Chimica e l'Industria, 47, 1064 to 1067 (1965)) and lactic acid, are formed. These products may be converted into oxalic acid with nitric acid during the second stage of the oxidation. It has been found that the initial reaction of the propylene with the oxidising medium, during which the various intermediate products are formed, is generally rapid but that prolonged contact of these intermediates with the oxidising medium is necessary to obtain good yields of oxalic acid. The overall oxidation of propylene is therefore slow and this results in low productivity from the equipment and necessitates the use of large reactors. Furthermore, prolonged heating leads to degradation of the intermediate products and of the oxalic acid with a consequent reduction in yield.

It has now been found that the time required for the manufacture of oxalic acid by nitric acid oxidation of propylene, optionally in the presence of oxygen and/or nitrogen peroxide, or by nitric acid oxydation of the intermediate products formed during the oxidation of propylene by nitric acid and/or nitrogen peroxide and optionally oxygen, can be reduced if these oxidations are carried out in the presence of a catalyst, particularly in the presence of iron, aluminum, chromium, tin, bismuth, iodine or a compound thereof which is soluble in the reaction medium.

Examples of suitable catalysts are the sulphates, nitrates, chlorides and phosphates of chromium, iron, aluminum, tin and bismuth; metallic oxides such as $Fe_2O_3$, $FeO$ and $CrO_3$; iodates; chromates; and chromic acid.

Suitable amounts of catalyst vary between 0.01 and 10% and preferably between 0.1 and 2% by weight (expressed as metal or as iodine as the case may be), based on the weight of the reaction medium.

The catalysts may be used to prepare oxalic acid in accordance with the process described in German patent specification No. 742,053 and in U.S. patent specification No. 3,081,345. They may also be used in the process claimed in application Ser. No. 539,775, which comprises passing gaseous propylene into an aqueous medium containing at least 50% by weight of nitric acid and at a temperature of 40° to 80° C. Equally, the catalysts may be used in the process claimed in application Ser. No. 624,973, which comprises introducing propylene into nitric acid and then heating the solution obtained with simultaneous removal of the nitrogen oxides formed.

When following the procedures of German patent specification No. 742,053 or application Ser. No. 539,775 the catalyst is added at the beginning of the process. With the two other processes the catalyst may be introduced either at the beginning of the reaction or at the beginning of the conversion of the intermediate oxidation products into oxalic acid. In practice it is normally most convenient first to dissolve the catalyst in the oxidising agent.

It is also possible to use the catalysts for the nitric acid oxidation of the intermediate compounds from the oxidation of propylene by nitric acid and/or nitrogen peroxide, after the intermediates have been isolated from the oxidation medium. Thus α-nitratolactic acid prepared in a known manner by reaction of propylene with nitrogen peroxide at a temperature below 21° C. may be oxidised by a nitric acid solution containing the catalyst. The catalysts may also be used to accelerate the nitric acid oxidation of lactic acid to oxalic acid. When this lactic acid has been obtained by acid hydrolysis of α-nitratolactic acid it is sufficient to add nitric acid and the catalyst to the acid solution of lactic acid.

The temperature, nitric acid concentration and molar ratio of nitric acid to the compound which is to be oxidised may vary within the limits previously described for the known processes.

The catalysts are particularly suitable for continuous nitric acid oxidation reactions because by lowering the contact time the productivity of the equipment is greatly improved.

It should be noted that during the formation of nitrates of α-hydroxycarboxylic acids by reaction of nitrogen peroxide with α-olefins, unstable products may be formed, with the consequent risk of uncontrollable decompositions or even explosions.

The following examples illustrate the invention. Gas flow rates refer to rates corrected to normal temperature and pressure conditions (0° C., 760 mm. of mercury) and the nitric acid concentrations are expressed in percent (weight/weight).

EXAMPLE 1

The equipment used is shown diagramatically in FIG. 1 of the accompanying drawings. It consists of the following components: a first reactor comprising a cylindrical glass chamber 1 which is 450 mm. high, 30 mm. in diameter and of 300 cm.³ useful volume; a conical chamber 2 connected to the lower part of the chamber 1 and closed off where it is connected to the latter by a plate 3 of No. 3 sintered glass (porosity 15–40μ); a propylene supply tube 4 entering at the apex of the conical chamber and a nitric acid supply tube 5 entering above the plate 3; a double jacket 6 through which a liquid maintained at a constant temperature can be circulated; a tube 7 for removing the reaction mixture by overflow; and a thermometer 8. A second reactor 9, identical to the first, is connected by a tube 7 to the first reactor, this tube entering just above the sintered glass plate of the second reactor. The latter is also provided with an oxygen inlet 10, a tube 11 for removing the reaction mixture by overflow and a tube 12 for removing the oxygen/nitrogen oxides mixture which is evolved from the reaction mixture to a device for the recovery of nitrous fumes. A 2-litre conical flask 13 is closed by means of a ground stopper through which tube 11 passes from the second reactor, the flask being fitted with a thermometer 14, a tube for removal of the reaction gases 15, and a heating system (not shown).

Before starting the process, water maintained at 20° C. is circulated through the double jacket 6, and the reactor 1 is then fed with 65% strength nitric acid at a rate of 280 g./hr. and with 100% propylene at a rate of 4.6 l./hr. The level of the reaction mixture in the reactor 1 rises to the level of the overflow 7. The reaction mixture (gas+liquid) then passes into the reactor 9 into which a stream of oxygen is simultaneously fed at a rate of 5.5 l./hr. through inlet 10. When the reaction mixture reaches the overflow 11 the equipment is operational. Water at 20° C. also circulates in the jacket of the reactor 9. The temperature of the reagents within both reactors is kept at 25° C. The mixture flowing out of reactor 9 is collected in the conical flask 13 for 5 hours. During this time the mixture collected in 13 is stirred with a magnetic stirrer and kept at 55° C. After these 5 hours, the supply of reagents is stopped and heating of the sample collected in flask 13 is continued for 6 hours at 55° C.; the reaction mixture obtained, which corresponds to employing 1.400 g. of 65% strength nitric acid and 1.045 mols of propylene, is then cooled to 20° C. The oxalic acid formed in flask 13 is determined on a sample by the usual analytical methods, after the oxalic acid has been isolated by precipitation as calcium oxalate.

The reaction balance is as follows:

Nitric acid concentration at the end of the reaction in the product in flask 13

$\left(\text{expressed as } \frac{HNO_3}{HNO_3+H_2O}\%\right)$—55%

Degree of conversion of propylene—100%.
Yield of oxalic acid based on propylene employed—66.8%.
Nitric acid consumption (expressed as kg. of 100% $HNO_3$ per kg. of oxalic acid dihydrate produced)—1.37 kg./kg.

The preceding experiment is repeated, except that 65% strength nitric acid containing 4% by weight of chromium nitrate [$Cr(NO_3)_3 \cdot 9\, H_2O$], i.e. 0.5% of metallic chromium, is used, and the product in flask 13, after stopping the supply of acid and of propylene, is heated for only 4 hours. The yield of oxalic acid based on the propylene employed is 77.5% and the nitric acid consumption is 1.2 kg. of 100% nitric acid per kg. of oxalic acid dihydrate produced.

EXAMPLE 2

Figure 2:
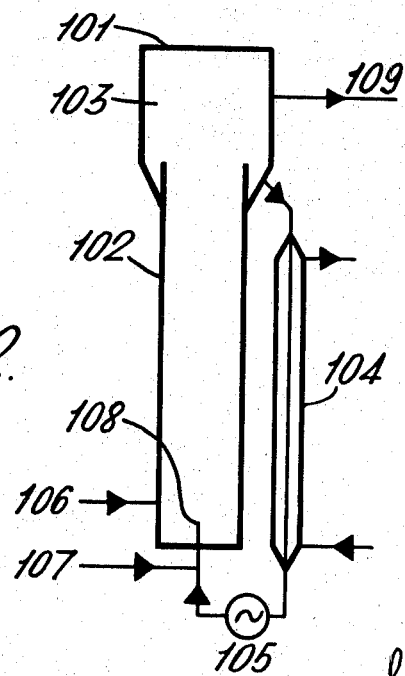

The equipment used is illustrated in FIG. 2. It comprises: a glass reactor 101 of 1,400 cm.³ useful volume consisting of a vertical cylindrical chamber 102 40 mm. in diameter and 550 mm. in height topped by a gas/liquid separation chamber 103 and connected at the top and bottom to a temperature control device consisting of a tube 104 12 mm. in diameter having a double jacket, the lower connecting conduit passing through a circulating pump 105. The reactor also comprises: a tube 106 for introducing nitric acid, a tube 107 for introducing propylene, a nozzle 108 which passes vertically into the lower part of the reactor, connected to the tube 107 and the pump 105, and a tube 109 starting at the top of the chamber 103 for the continuous withdrawal of the reaction mixture.

Propylene and a 70% strength aqueous nitric acid solution containing 7% of nitrogen peroxide are continuously introduced into the reactor described above, the flow rates being 3,000 g./hr. for the acid and 20 l./hr. for the propylene, resulting in reaction of 0.4 mol per litre of the nitric acid solution. The temperature of the reaction mixture is kept at 30° C. and the reagents are kept in the equipment for an average of 30 minutes. The reaction mixture is continuously withdrawn into a storage apparatus. Analysis shows that the mixture withdrawn does not contain oxalic acid.

4.5 kg. of the mixture collected in this way is introduced into a 6 l. glass flask fitted with a stirrer, a thermometer, a sampling device and a gas outlet tube. 140 g. of chromium nitrate [$Cr(NO_3)_3 \cdot 9\, H_2O$], i.e. 0.44% by weight of chromium based on the mixture being treated, are added to the contents of the flask and the temperature is raised to 50° C. by immersion in a controlled temperature bath. (The temperature is reached within 45 minutes.) Oxalic acid is then periodically determined in samples of the reaction mixture taken at regular intervals, the time at which the temperature reaches 50° C. being taken as zero time. The oxalic acid is determined in the usual manner after precipitation as its calcium salt.

Three similar experiments are carried out, one without a catalyst, one with ferric nitrate (providing 0.4% by weight of Fe) and one with stannous chloride (providing 0.5% by weight of Sn). The results obtained are given in Table I below.

| | Rate of formation of oxalic acid (mol/litre/hour) | | | | Yield of oxalic acid, based on propylene employed (percent) | | | |
|---|---|---|---|---|---|---|---|---|
| Time, hours | Chromium | Iron | Tin | Without catalyst | Chromium | Iron | Tin | Without catalyst |
| 0 | 0.41 | 0.41 | 0.47 | 0.29 | 26.1 | 48.3 | 51.8 | 11.9 |
| 0.25 | 0.24 | 0.195 | 0.17 | 0.19 | 54 | 63.3 | 67.9 | 26 |
| 0.50 | 0.18 | 0.12 | 0.10 | 0.15 | 66.6 | 71.5 | 75.2 | 36.6 |
| 1 | 0.065 | 0.035 | 0.04 | 0.10 | 76.6 | 75.5 | 82 | 51.5 |
| 2 | 0 | 0 | 0 | 0.04 | 81.7 | 80 | 84.3 | 69.5 |
| 3 | 0 | 0 | 0 | 0.02 | 81.7 | 80 | 84.3 | 76.8 |

EXAMPLE 3

Four experiments are carried out as described in Example 2, one being carried out without a catalyst and the other three by replacing the chromium nitrate respectively by potassium iodate, aluminium nitrate and bismuth nitrate in an amount corresponding to 0.5% of iodine, 0.2% of aluminum and 0.5% of bismuth respectively (these percentages being by weight based on the total weight of mixture being treated). The determinations carried out from the time when the temperature reaches 50° C. give the results shown in Table II below.

| | Yield of oxalic acid based on propylene employed (percent) | | | |
|---|---|---|---|---|
| Time (hours) | Without catalyst | Iodine | Aluminium | Bismuth |
| 0 | 11.9 | 26.3 | 29.7 | 21.4 |
| 0.25 | 26 | 40.8 | 42.5 | 42.2 |
| 0.50 | 36.6 | 51.2 | 53.85 | 51.45 |
| 1 | 51.5 | 64.5 | 63.5 | 56.15 |
| 2 | 69.5 | 74.9 | 76.8 | 71 |

EXAMPLE 4

α-Nitratolactic acid is prepared as follows: Into a glass reactor, identical to the first reactor of Example 1, fitted with a thermometer and a gas outlet tube, are introduced 201 g. of nitrogen peroxide maintained at 0° C. by circulating brine in the double jacket. Mixed oxygen and propylene are then introduced at rates of 15 l./hr. and 7 l./hr., respectively, through tube 4 for 5 hours; the gas flows are then stopped and the excess nitrogen peroxide is removed by distillation in vacuo at 25° C. 237 g. of α-nitratolactic acid are obtained, which are then introduced, together with 4,220 g. of 70% strength nitric acid and 34.8 g. of chromic acid (i.e. 0.4% by weight of chromium based on the weight of the reaction medium) into a 5-litre glass flask fitted with a thermometer, a stirrer system, a gas outlet tube and a sampling system. The temperature of the mixture is raised to 50° C. by immersing the flask into a water bath at a controlled temperature and the oxalic acid formed is determined at regular intervals as described in Example 1.

The experiment is repeated omitting the chromic acid. The results shown in Table III are obtained:

TABLE III

| | Rate of formation of oxalic acid (mol/litre/hour) | | Yield of oxalic acid based on propylene employed in the oxidation (percent) | |
|---|---|---|---|---|
| Time (hours) | In the presence of Cr | Without catalyst | In the presence of Cr | Without catalyst |
| 0 | 0.111 | 0.087 | 0 | 0 |
| 0.25 | 0.206 | | 25.7 | |
| 0.5 | 0.307 | | 41.85 | |
| 1 | 0.065 | 0.087 | 60.3 | 19 |
| 1.5 | 0.013 | | 63.6 | |
| 2 | | 0.087 | | 38.9 |
| 3 | | 0.085 | | 60.8 |
| 3.5 | 0.013 | | 69 | |

EXAMPLE 5

The following are introduced into the 5-litre flask used in Example 4: 3.76 kg. of 70% strength nitric acid; 182.6 g. of lactic acid; and 30.8 g. of chromic acid (i.e. 0.4% by weight of chromium based on the weight of the reaction mixture).

The mixture is heated to 50 C. and the speed of formation of oxalic acid as a function of time is measured. The same experiment is repeated in the absence of chromic acid. The results in Table IV below are obtained:

TABLE IV

| | Rate of formation of oxalic acid (mol/litre/hour) | | Yield of oxalic acid based on lactic acid (percent) | |
|---|---|---|---|---|
| Time (hours) | In the presence of Cr | Without of Cr | In the presence of Cr | Without Cr |
| 0 | 0.42 | 0 | 3.3 | 0 |
| 0.25 | 0.42 | | 17.9 | |
| 0.5 | 0.42 | 0 | 32.5 | 0 |
| 0.75 | 0.315 | | 47.25 | |
| 1 | | 0.043 | | 2.1 |
| 1.25 | 0.103 | | 62.7 | |
| 1.5 | | 0.1 | | 8.2 |
| 1.75 | 0.094 | | 70.5 | |
| 2 | | 0.155 | | 17.2 |
| 2.25 | 0.061 | | 78.1 | |
| 3 | | 0.173 | | 43.5 |
| 3.25 | 0.020 | | 80.6 | |
| 4 | | 0.107 | | 61.7 |
| 4.25 | 0.009 | | 82.2 | |

We claim:
1. In a process for the preparation of oxilic acid by oxidation with aqueous nitric acid of concentration at least 50% by weight at a temperature of from 40° to 120° C. which comprises contacting propylene with nitric acid, optionally in the presence of oxygen and/or nitrogen peroxide, or which comprises contacting with nitric acid an intermediate product containing two or three carbon atoms which can be formed by nitric acid and/or nitrogen peroxide oxidation of propylene, this oxidation being optionally made in the presence of oxygen, the improvement which consists in adding to the reaction medium as catalyst from 0.1 to 2% by weight, expressed as metal or as iodine, based on the weight of the reaction mixture, of iron, aluminium, chromium, tin, bismuth, iodine or a compound thereof which is soluble in the reaction medium.

2. Process according to claim 1, in which the intermediate product is lactic acid or α-nitratolactic acid.

3. Process according to claim 1, in which the catalyst is a sulphate, nitrate, chloride or phosphate of iron, aluminium, chromium tin or bismuth; ferrous oxide, ferric oxide, or chromium trioxide; an iodate; a chromate; or chromic acid.

References Cited

UNITED STATES PATENTS 2,847,453   8/1958   Gardner et al. _____ 260—533

FOREIGN PATENTS 742,053   10/1943   Germany _____ 260—533

LORRAINE A. WEINBERGER, Primary Examiner

D. E. STENZEL, Assistant Examiner